US012596973B2

(12) United States Patent
Han et al.

(10) Patent No.: US 12,596,973 B2
(45) Date of Patent: Apr. 7, 2026

(54) ACTION ITEM GENERATION BASED ON MULTICHANNEL CONTEXT

(71) Applicant: Zoom Video Communications, Inc., San Jose, CA (US)

(72) Inventors: Lin Han, Los Altos, CA (US); Hong Hao, Suzhou (CN); Jingwei Li, Suzhou (CN); Zijian Li, Suzhou (CN); Yike Liu, Santa Clara, CA (US); Ying Lu, Cerritos, CA (US); Chensi Mao, Hangzhou (CN); Keping Zhai, Suzhou (CN)

(73) Assignee: Zoom Communications, Inc., San Jose, CA (US)

( * ) Notice: Subject to any disclaimer, the term of this patent is extended or adjusted under 35 U.S.C. 154(b) by 155 days.

(21) Appl. No.: 18/385,058

(22) Filed: Oct. 30, 2023

(65) Prior Publication Data

US 2025/0139543 A1　May 1, 2025

(51) Int. Cl.
*G06Q 10/00*　(2023.01)
*G06Q 10/0631*　(2023.01)

(52) U.S. Cl.
CPC ............................ *G06Q 10/063118* (2013.01)

(58) Field of Classification Search
USPC ................................................ 705/7.19, 7.21
See application file for complete search history.

(56) References Cited

U.S. PATENT DOCUMENTS

| | | | | | |
|---|---|---|---|---|---|
| 12,169,802 | B1 * | 12/2024 | Eldan | ............... | G06Q 10/06316 |
| 2020/0104369 | A1 * | 4/2020 | Bellegarda | ............... | G06F 40/30 |
| 2020/0380389 | A1 * | 12/2020 | Eldeeb | ................ | G06F 16/285 |
| 2021/0149996 | A1 * | 5/2021 | Bellegarda | .......... | G10L 15/1815 |
| 2022/0093088 | A1 * | 3/2022 | Rangarajan Sridhar | ..................... | G06F 16/338 |
| 2022/0229999 | A1 | 7/2022 | Vig et al. | | |
| 2022/0270594 | A1 | 8/2022 | Sejpal et al. | | |

(Continued)

FOREIGN PATENT DOCUMENTS

EP　　　4002231 A1　5/2022

OTHER PUBLICATIONS

Morariu, Cristina, et al. "Machine learning for predictive scheduling and resource allocation in large scale manufacturing systems." Computers in Industry 120 (2020): 103244. (Year: 2020).*

(Continued)

*Primary Examiner* — Gurkanwaljit Singh
(74) *Attorney, Agent, or Firm* — Kilpatrick Townsend & Stockton, LLP

(57) ABSTRACT

Example methods and systems provide a workplace assistant application that can detect electronic content associated with a remote user and access multiple communication channels connected to a workplace assistant client application. The system can submit the electronic content to one or more predictive models to provide a context for the electronic content. The context is based at least in part on information from multiple channels. The system can generate, using the predictive model(s), an action item based at least in part on the context of the electronic content as well as display or store the action item using the workplace assistant client application. An action item, as examples, can be a "to do" item, a meeting agenda, a reminder, a meeting, a task, or some combination of one or more of these.

20 Claims, 8 Drawing Sheets

(56)                    References Cited

U.S. PATENT DOCUMENTS

| | | |
|---|---|---|
| 2023/0030822 A1 | 2/2023 | Nieuwegiessen et al. |
| 2023/0126090 A1 | 4/2023 | van de Nieuwegiessen et al. |
| 2023/0164104 A1 | 5/2023 | Walters et al. |
| 2023/0282218 A1* | 9/2023 | Moynihan ............. G06F 16/433 |
| | | 704/235 |
| 2023/0385778 A1* | 11/2023 | Johnson, III ....... G06Q 10/1095 |
| 2023/0419270 A1* | 12/2023 | Li ......................... H04L 65/403 |
| 2024/0176960 A1* | 5/2024 | Maurer ................. G06F 16/345 |
| 2024/0362594 A1* | 10/2024 | Ramsey ................... G06N 3/08 |
| 2025/0045313 A1* | 2/2025 | Rogynskyy .......... G06N 3/0475 |
| 2025/0063083 A1* | 2/2025 | Grinberg .......... G06Q 10/06393 |

OTHER PUBLICATIONS

Hong, Ying, et al. "Improving the accuracy of schedule information communication between humans and data." Advanced Engineering Informatics 53 (2022): 101645. (Year: 2022).*
International Search Report and Written Opinion for PCT/US2024/046347 mailed Oct. 31, 2024.
Tonga et al., "A Review on On Device Privacy and Machine Learning Training", 2022 International Conference On Artificial Intelligence In Everything (AIE), IEEE, Aug. 2, 2022; pp. 679-684.
International Search Report and Written Opinion for PCT/US2024/046342 mailed Dec. 16, 2024.

* cited by examiner

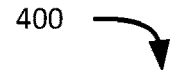

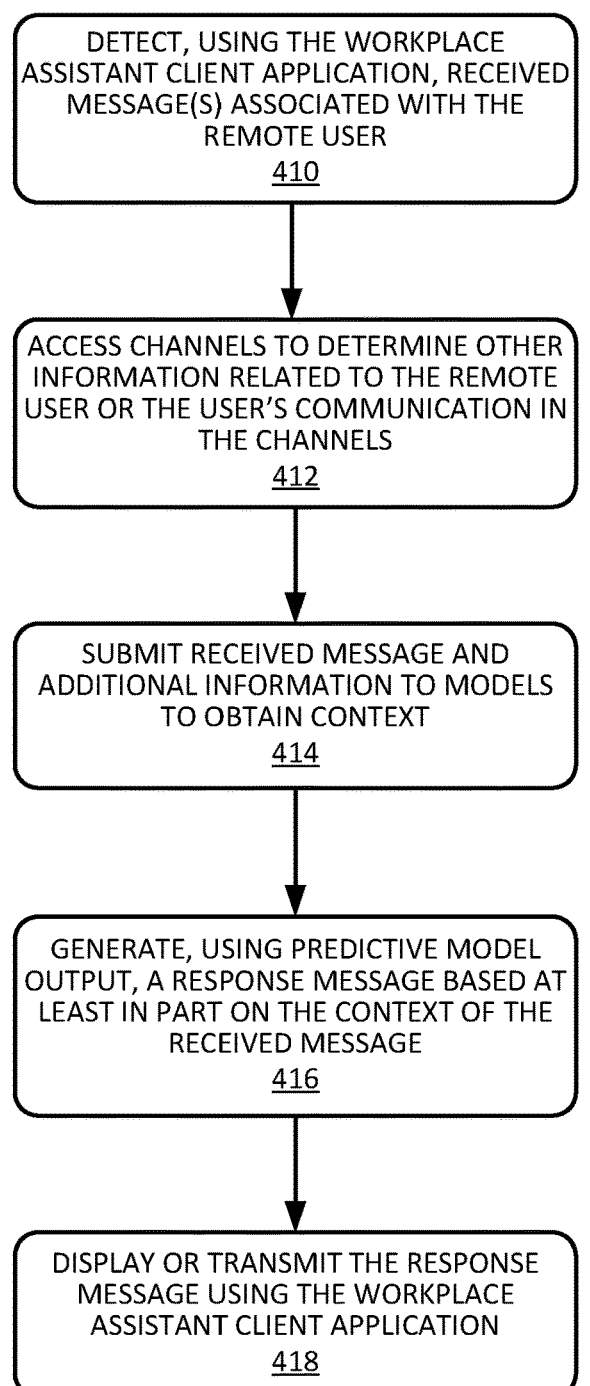

DETECT, USING THE WORKPLACE ASSISTANT CLIENT APPLICATION, RECEIVED MESSAGE(S) ASSOCIATED WITH THE REMOTE USER
410

ACCESS CHANNELS TO DETERMINE OTHER INFORMATION RELATED TO THE REMOTE USER OR THE USER'S COMMUNICATION IN THE CHANNELS
412

SUBMIT RECEIVED MESSAGE AND ADDITIONAL INFORMATION TO MODELS TO OBTAIN CONTEXT
414

GENERATE, USING PREDICTIVE MODEL OUTPUT, A RESPONSE MESSAGE BASED AT LEAST IN PART ON THE CONTEXT OF THE RECEIVED MESSAGE
416

DISPLAY OR TRANSMIT THE RESPONSE MESSAGE USING THE WORKPLACE ASSISTANT CLIENT APPLICATION
418

*FIG. 4*

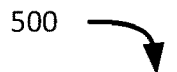

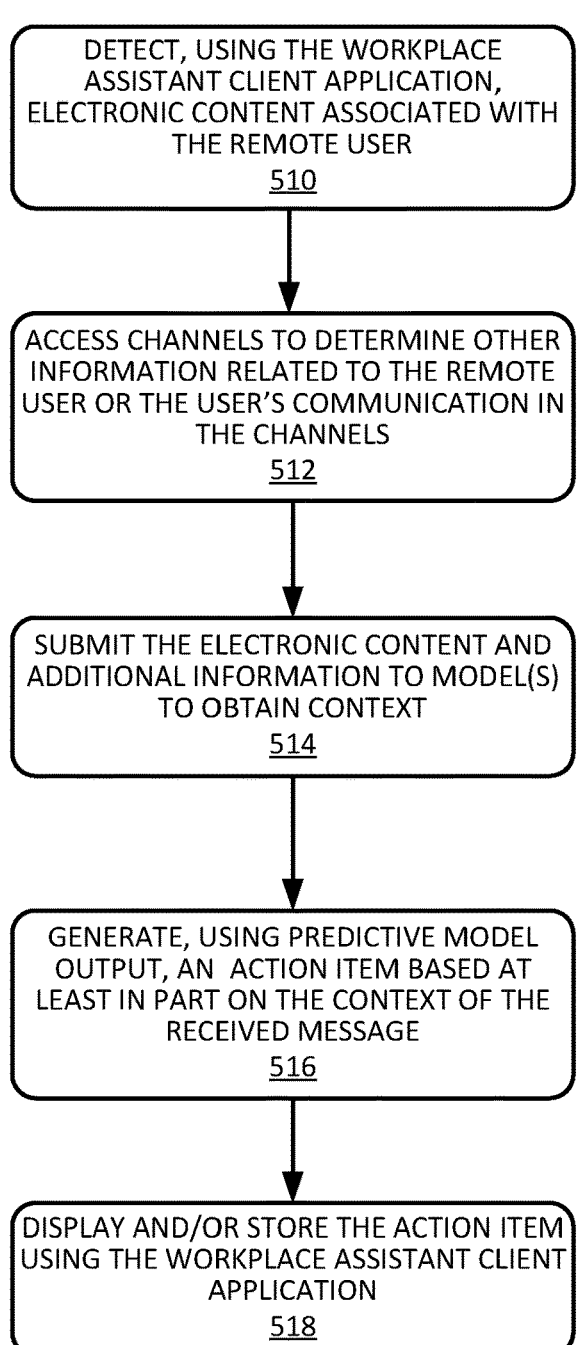

DETECT, USING THE WORKPLACE ASSISTANT CLIENT APPLICATION, ELECTRONIC CONTENT ASSOCIATED WITH THE REMOTE USER
510

ACCESS CHANNELS TO DETERMINE OTHER INFORMATION RELATED TO THE REMOTE USER OR THE USER'S COMMUNICATION IN THE CHANNELS
512

SUBMIT THE ELECTRONIC CONTENT AND ADDITIONAL INFORMATION TO MODEL(S) TO OBTAIN CONTEXT
514

GENERATE, USING PREDICTIVE MODEL OUTPUT, AN ACTION ITEM BASED AT LEAST IN PART ON THE CONTEXT OF THE RECEIVED MESSAGE
516

DISPLAY AND/OR STORE THE ACTION ITEM USING THE WORKPLACE ASSISTANT CLIENT APPLICATION
518

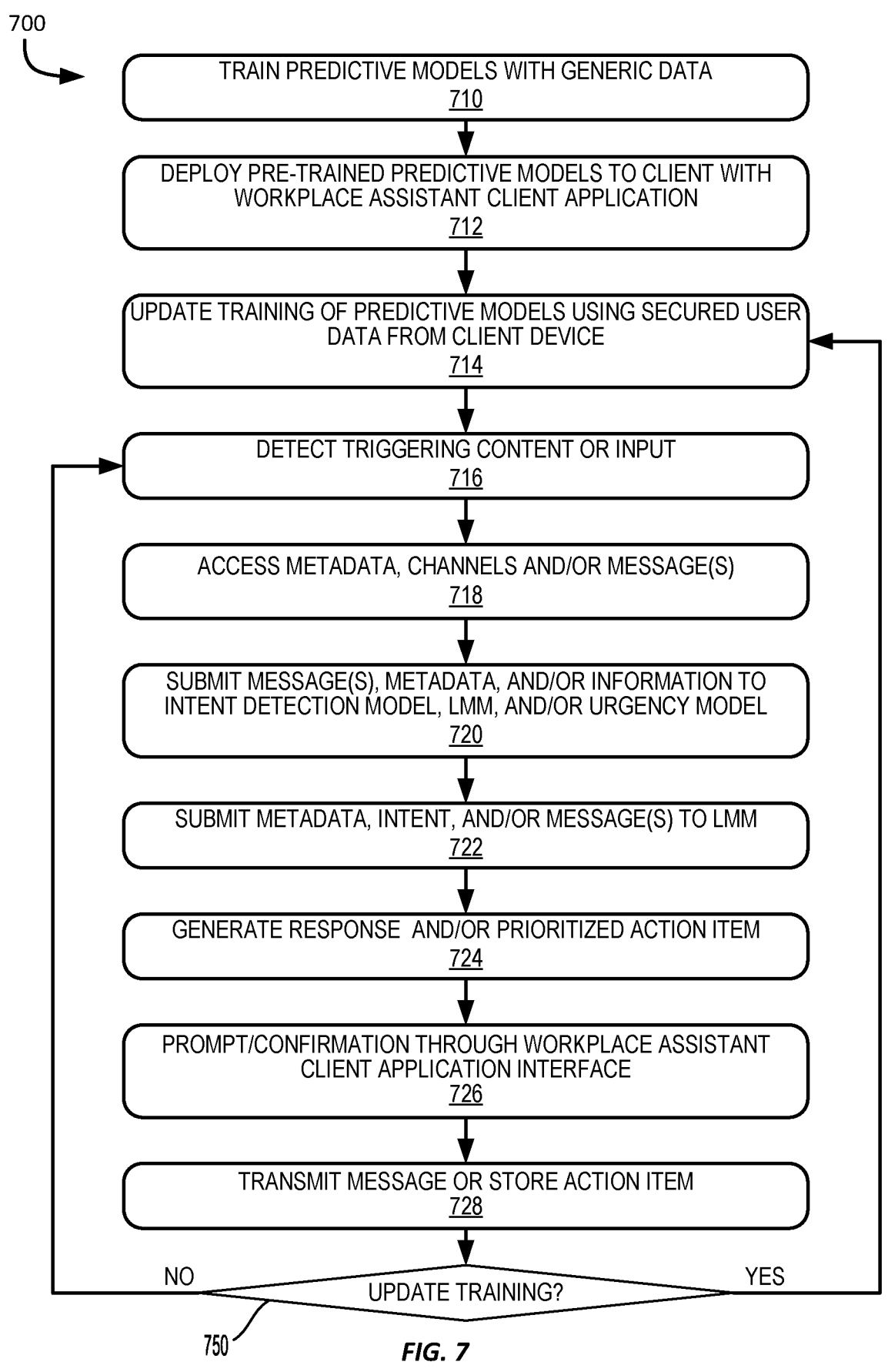

TRAIN PREDICTIVE MODELS WITH GENERIC DATA
710

DEPLOY PRE-TRAINED PREDICTIVE MODELS TO CLIENT WITH WORKPLACE ASSISTANT CLIENT APPLICATION
712

UPDATE TRAINING OF PREDICTIVE MODELS USING SECURED USER DATA FROM CLIENT DEVICE
714

DETECT TRIGGERING CONTENT OR INPUT
716

ACCESS METADATA, CHANNELS AND/OR MESSAGE(S)
718

SUBMIT MESSAGE(S), METADATA, AND/OR INFORMATION TO INTENT DETECTION MODEL, LMM, AND/OR URGENCY MODEL
720

SUBMIT METADATA, INTENT, AND/OR MESSAGE(S) TO LMM
722

GENERATE RESPONSE  AND/OR PRIORITIZED ACTION ITEM
724

PROMPT/CONFIRMATION THROUGH WORKPLACE ASSISTANT CLIENT APPLICATION INTERFACE
726

TRANSMIT MESSAGE OR STORE ACTION ITEM
728

NO          UPDATE TRAINING?          YES

ACTION ITEM GENERATION BASED ON MULTICHANNEL CONTEXT

FIELD

The present application generally relates to automatic generation of action items such as those related to scheduling and planning, from within a computerized workplace assistant. More particularly the application relates to systems and methods for generating action items that are informed by context as determined from multiple communication channels available to the workplace assistant.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 4 illustrates an example method for providing message management based on multichannel context.

FIG. 5 illustrates an example method for providing action item generation based on multichannel context.

FIG. 7 illustrates example method for providing message management and action item generation based on multichannel context.

DETAILED DESCRIPTION

Figure 1:
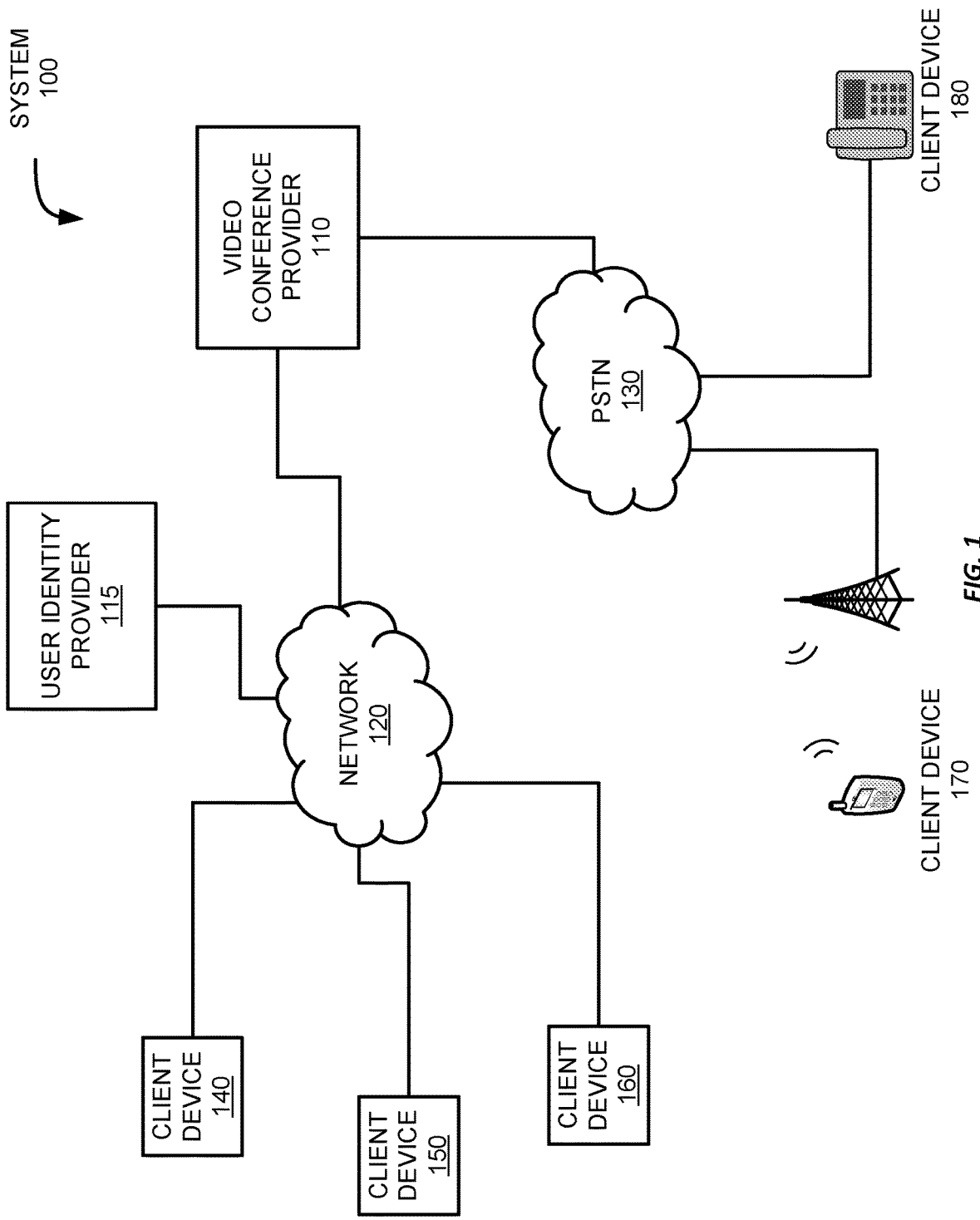
FIGS. 1 through 3 illustrate example systems to enable message management and action item generation based on multichannel context.

Examples are described herein in the context of systems and methods for providing action item generation based on context across multiple channels. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Digital telephone systems as well as videoconferencing systems enable their users to engage in teleconferencing by creating and attending conferences (or "meetings") via various types of client devices. After joining a meeting, the participants receive audio and/or video streams or feeds (or "multimedia" streams or feeds) from the other participants and, in the case of a videoconference, are presented with views of the video feeds from one or more of the other participants and audio from the audio feeds. Using these different modalities, the participants can see and/or hear each other, engage more deeply, and generally have a richer experience despite not being physically in the same space.

In the case of videoconferencing systems, to create a meeting, a person (referred to as the "host" or "meeting host") accesses the videoconferencing system, schedules a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. For purposes of the discussion herein, the term "host" encompasses hosts and co-hosts. Hosts can manage and control the videoconferencing session.

A team chat application can be used to streamline communication and promote collaboration and transparency between users. A team chat application provides instant text messaging between users who have the application installed on a client device. Some team chat applications are integrated with a videoconferencing application or a project management application. A team chat application can provide users in an enterprise with a readily available and comfortable way to reach out to one another, make connections, and increase communication efficiency. Team chat systems typically include a server application or component along with client applications for different types of user devices. Chat content is persistency stored in the server application or component so that chat history is available to participants in the future even after all participants have disconnected or shut down their client applications for a time. Team chat applications can include functions for creating chat groups. These functions may include various security mechanisms for limiting access to groups based on divisions within the enterprise, credentials established for a group, etc.

Virtual spaces enable social productivity. Many knowledge workers find team connection important to the timely and efficient completion of work tasks and projects. A virtual space can replicate the "working alongside" aspect of an open office environment and provide predictability for a hybrid or virtual working environment. A virtual space can also provide a virtual place for serendipitous meetings, or to return to for regular meetings. In some systems, virtual spaces are leveraged from team chat services as well as videoconferencing or audioconferencing services to provide themed or organizational team spaces for chat, video, and audio communication, all seamlessly available in a client application interface. The interface can be part of a client application dedicated to virtual spaces, or can be part of client application that provides multiple communication functions. A virtual space can be tied to a virtual conference room within a videoconferencing system.

A workplace assistant is a software application that provides some of the functions of a personal information manager, but may also provide integrated communication tools for various communication channels and platforms. Personal information managers have historically been used for managing contacts, calendars, tasks, appointments and other personal data. The information is stored in files, either on a client device or on a server. A workplace assistant can provide those functions directly, or can provide access to various application programming interfaces (APIs) that enable the workplace assistant to provide an integrated front end for databases of information. A workplace assistant can also provide access to a videoconferencing system, digital phone system, chat platforms, and the like.

To provide more versatility and convenience for users of modern digital telecommunication platforms and applications, a workplace assistant application according to this disclosure includes features for conversion of communication and/or other electronic content into action items such as defined meetings and tasks. Action items can be generated by extraction from communication content, information aggregation from multiple channels, and understanding of the context of the content by making use of predictive, machine-learning models. Channels can include email, chat, and teleconferencing channels such as those for communication using digital telephony, videoconferencing meetings, or virtual spaces. Channels can also include stored documents and social media, both internal and external to an enterprise.

The workplace assistant application can use the context determined from various channels as well as stored metadata to automatically generate action items that are in part based on situational context. Stored metadata can include, as examples, relationship, presence, relevance, group membership, active channels, mentions, or previous interactions. The context can be determined from multiple connected channels and/or from multiple types of information available to the workplace assistant application. In some examples, these automatically generated action items can include details related to people, preexisting schedules, and information in external applications such as those for project management or collaboration. Action item generation can take place "on the fly." An action item, as examples, can be a "to do" item, a meeting agenda, a reminder, a scheduled meeting, a task, or some combination of one or more of these.

A system according to some examples can detect, at a workplace assistant client application, electronic content associated with a remote user and access multiple channels coupled to the workplace assistant client application. The system can submit the electronic content to a predictive model to provide a context for the electronic content. The context is based at least in part on information from multiple channels. The system can generate, using output of the predictive model, an action item based at least in part on the electronic content and the context of the electronic content, and also display or store the action item using the workplace assistant client application.

In some examples, the workplace assistant application makes use of multiple predictive models to generate action items. For example, the application can use one or more of a machine-learning large language model, a machine learning intent detection model, and a machine-learning urgency model. One or more of these models can be deployed for access by the workplace assistant client application over a network. Alternatively, or in addition, one or more of these models can be deployed along with or as part of the workplace assistant client application. In this case, the model can be deployed after training with generic or de-identified user data, but training can be updated using secured user data specific to the client device. This deployment technique provides for action item generation that is more accurate and salient for a particular user while safely keeping user data stored on the client device in an encrypted format and/or sequestered in a secure enclave of the device's processor or memory to protect user privacy.

The techniques disclosed herein for generating context-based action items enable a user of a workplace assistant platform to obtain context-sensitive recommendations for action items to be stored by the user for or within various software systems, such as scheduling and task management systems, and optionally, to have those action items automatically saved. The action item generation can facilitate effective collaboration because the system accesses multiple channels of communication and/or metadata to programmatically determine the nature of information being sought or offered by other users, where the information is relevant to various action items that may be taken or scheduled.

This illustrative example is given to introduce the reader to the general subject matter discussed herein and the disclosure is not limited to this example. The following sections describe various additional non-limiting examples and examples of systems and methods for providing context-based action item generation.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
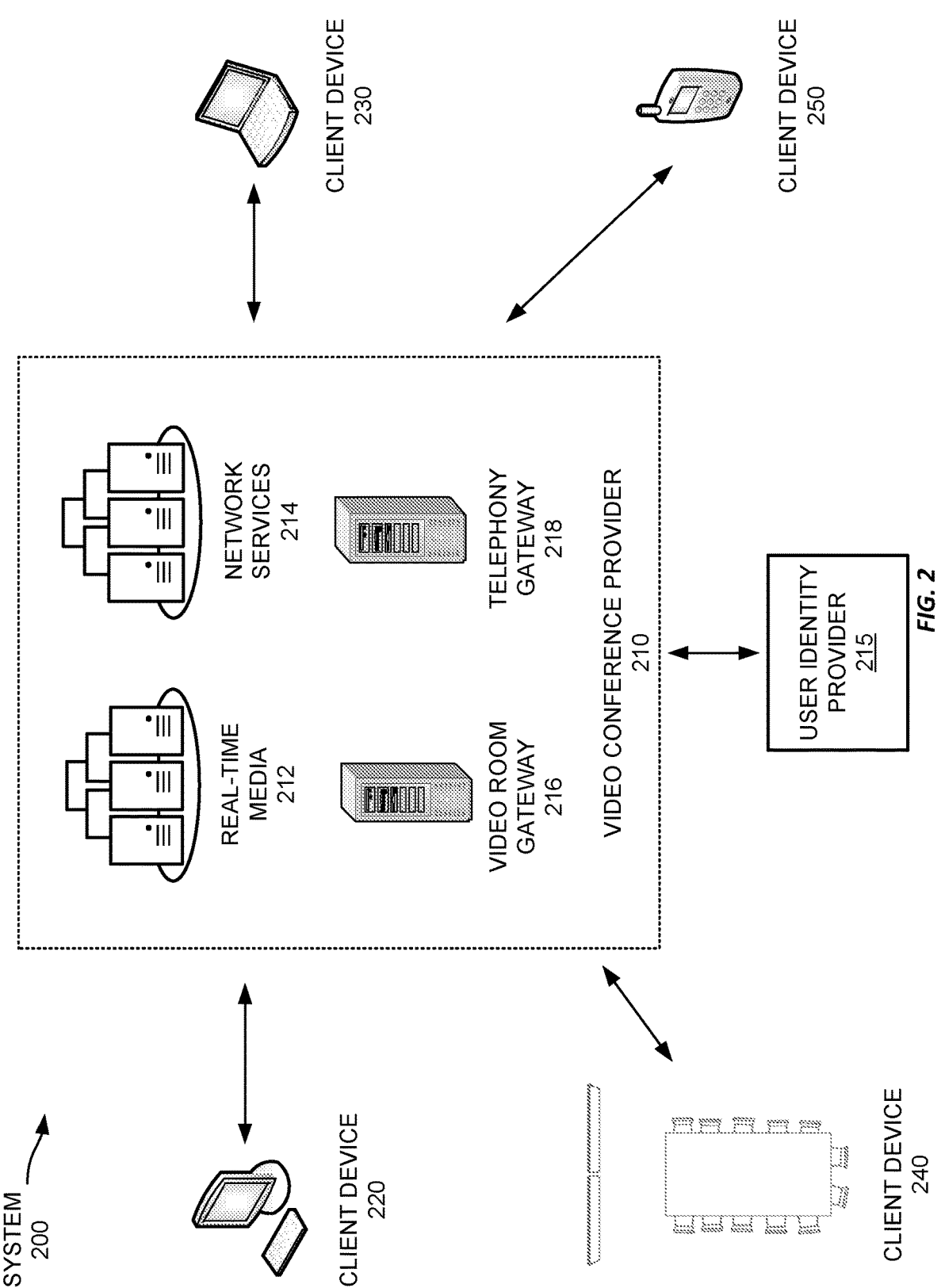

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the system of video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials.

Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
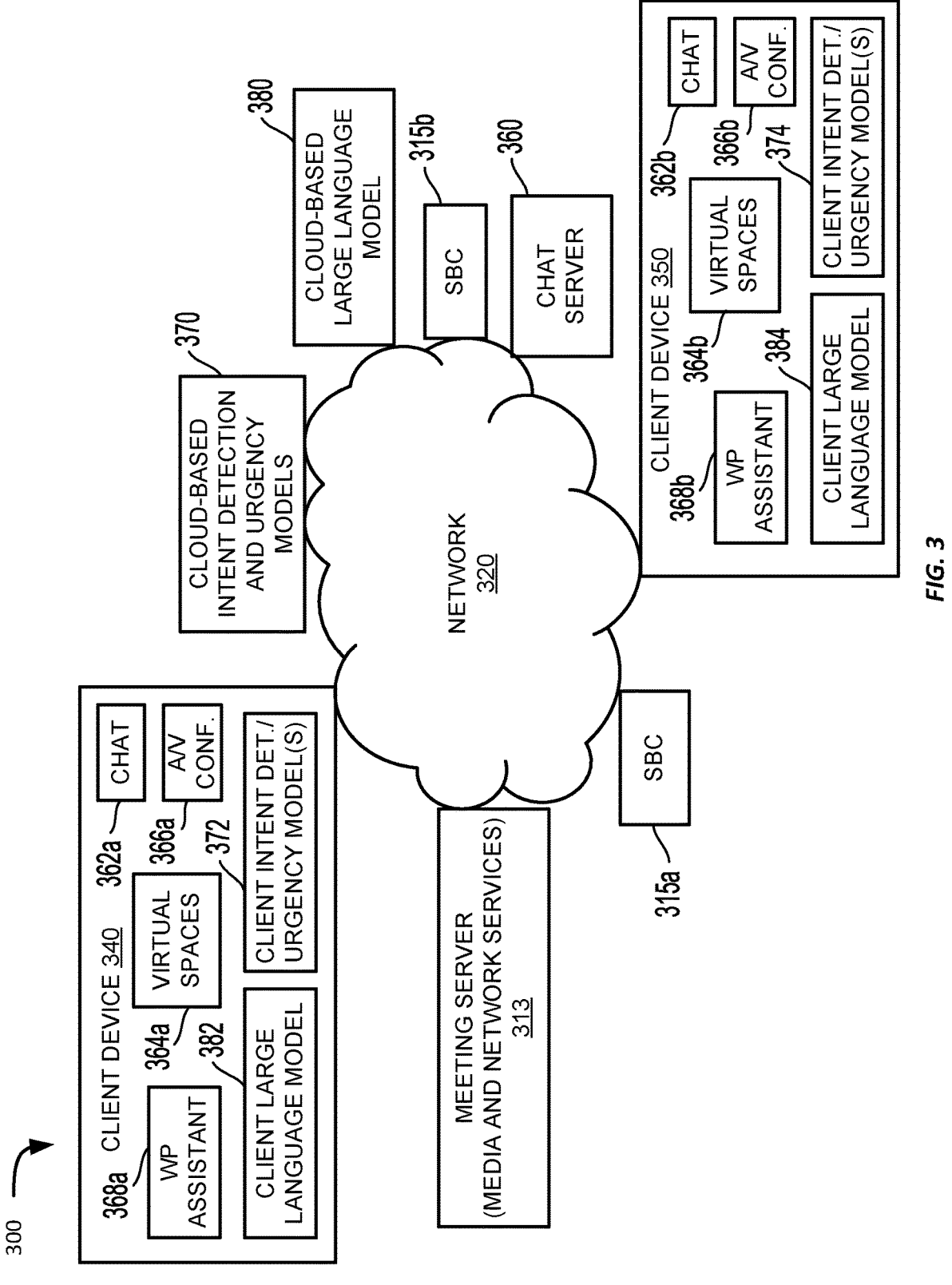

Referring now to FIG. 3, FIG. 3 shows an example integrated communication system 300 in which at least videoconferencing functionality, digital phone functionality, chat functionality and workplace assistant functionality is provided to various client devices, such as client device 340 and client device 350, each communicatively coupled to network 320. System 300 includes the message generation and action item generation capabilities as described herein. System 300 includes meeting server 313. Meeting server 313 may also be referred to as a multimedia router and can be implemented by the real-time media servers 212 working with the network services servers 214. The meeting server maintains stored representations of virtual meetings taking place in the system so that the meeting server can keep track of the status of meetings without constantly exchanging this information with client devices such as client device 340 and client device 350. System 300 includes chat server 360 that provides team chat services. Server 360 stores group definitions, which define chat groups, each with multiple users. The chat dialogs and identities of users participating in the chat groups can be presented to users through graphical interfaces of client applications running on client devices 340 and 350, either through a chat client application or through a workplace assistant client application. Chat groups can also be provided in a Web browser along with other visual interface features to enable users of computing devices without the client application installed to make use of team chat services.

Example system 300 includes session border controllers (SBCs) 315a-b for providing digital telephony services. System 300 includes two SBCs as an example. Any number of SBCs can be used; multiple SBCs provide redundancy. The SBCs provide call CODECs, audio processing, error correction, links to telephone carriers, and encryption for digital telephone calls between client applications to provide digital phone services. The SBCs secure client and carrier communications passing through a data center. The SBCs include load balancers and call switches. As an example, signaling for call setup, management, and teardown in system 300 can be accomplished using session initiation protocol (SIP). SIP communication through the call switches is evenly distributed by the load balancers based on call volume. The call switches provide call control for digital telephone communications and can provide PBX functionality. The call switches also provide integrated functions to enable calls to be transitioned to videoconferences using meeting server 313 and/or vice versa.

In this example, client device 340 and client device 350 each include an instance of a team chat client application, and audio and/or video (A/V) conferencing client application, a virtual spaces client application, and the workplace assistant client application. Client device 340 includes team chat client application 362a, virtual spaces client application 364a, A/V conferencing application 366a, and workplace assistant client application 368a. Client device 350 includes team chat client application 362b, virtual spaces client application 364b, A/V conferencing application 366b, and workplace assistant client application 368b. Team chat client applications 362a-b are communicatively coupled to chat server 360 through network 320. The virtual spaces client applications 364a-b leverage data and communication from chat server 360 and meeting server 313 in order to present virtual spaces within the virtual spaces client application. Virtual spaces in this example are maintained on the client device. A/V conferencing client applications can be coupled to meeting server 313 to provide videoconferencing meetings or to the SBCs to provide audioconferencing using digital telephony. Transcripts from A/V conferencing can be accessed to provide additional channels or additional metadata to provide context.

The workplace assistant clients, as an example, may be web applications that run on client devices, each serving as information management application for the user of the client device. The workplace assistant client application provides a user interface through which a user can discover messages in order to determine who is looking for the user and why the user is being sought. Information from multiple sources such as chats, calls, and meetings can be accessed to make these determinations. Documents can be accessed for mentions of a user. The workplaces assistant client application can also provide ways to efficiently deal with others and answer some.

The workplace assistant client application can access information communicated from various channels, for example virtual spaces, electronic whiteboards, email, team chat, digital telephony channels, and meetings. These channels can be communicatively coupled to the workplace assistant client application on the client device, from the cloud, or from one or more servers.

In some cases, connectively between a channel and the workplace assistant client application may be made on the client device because the channel is client-based. For example, the connection between virtual spaces client applications 364a-b and respective workplace assistant client applications 368a-b may reside on the client device because the virtual spaces client application may be completely client-based, leveraging other servers to access needed data. However, for team chat and meetings, servers 360 and 313 are used, respectively. The workplace assistant client application can access the relevant channels from those servers or on the respective client device. The software modules involved can also access data or information from a particular channel in both ways, switching between the two sources as efficiency dictates given network performance and computational load of the respective client device to provide the best user experience.

Continuing with FIG. 3, system 300 includes cloud-based intent detection and urgency model 370 and cloud-based large language model 380. Either or both of workplace assistant client applications 368a-b can be configured to access these models over network 320. The intent detection model selects a category amongst actions, such as an action to share to channel, initiate a google document, change a setting, send a particular type of message, and so on. The urgency model assesses the metadata and context of the received message or the otherwise detected electronic content to label the urgency of the respective input. For example, the urgency model may label the urgency as high, medium and low. The urgency model functions as a classification model service. In this example, the intent detection model and urgency model are deployed in the cloud as a common software module, so that one API call can obtain both kinds of information. However, these functions can be deployed as separate software models, with one predictive, machine-learning model for each of these functions.

Alternatively, or in addition, the workplace assistant client application can use a client-based models. For example, workplace assistant client application 368a in FIG. 3 can access client intent detection model/urgency model(s) 372 and client large language model 382, and workplace assistant client application 368b can access client intent detection/urgency model(s) 374 and client large language model 384. Cloud-based models can be trained using generic data, while client-based models can be trained with either or both of generic data and client-device based data. In some examples, a client-based model can be trained on a server or in the cloud in part using generic data, deployed to a client device, and then additionally trained using secured user data gathered and stored in association with the workplace assistant client application. As in the cloud-based example, the intent detection model and urgency model can be deployed in the cloud as a common software module or as separate modules.

In some examples of the present disclosure, implementations may include or otherwise use one or more artificial intelligence or machine learning (collectively, AI/ML) systems having one or more models trained for one or more purposes. Use of such AI/ML systems, such as for certain features or functions, may be turned off by default, where a user, an organization, or both have to opt-in to utilize the features or functions that include or otherwise use an AI/ML system. User or organization consent to use the AI/ML systems or features may be provided in one or more ways, for example, as explicit permission granted by a user prior to the use of an AI/ML feature, as administrative consent configured using administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow the user to opt-out of use of the AI/ML systems or features.

To enhance privacy and safety, as well as provide other benefits, the AI/ML processing system may be prevented from using personal information (e.g., customer audio, video, chat, screen-sharing, attachments, or other communications-like customer content (such as poll results, whiteboards, or reactions)) to train any AI/ML models and instead only use the personal information for inferencing of the AI/ML processing system. Instead of using personal information to train AI/ML models, AI/ML model training may be performed using one or more commercially licensed data sets that do not contain the personal information of the user or organization.

Referring now to the method 400 illustrated in FIG. 4, FIG. 4 shows an example method 400 for providing multi-channel context-based message generation. The description of the method 400 in FIG. 4 will be made with reference to the system of FIG. 3. However, any suitable system according to this disclosure may be used, such as the example systems 100 and 200 shown in FIGS. 1 and 2.

At block 410, a processor or processors, for example, a processor such as processor 810 (discussed below with respect to FIG. 8) running in the servers and/or in the client devices, detects, using the workplace assistant client application, one or more received messages associated with a remote user. For example, the workplace assistant client application 368a or 368b may be accessing various messaging servers or applications in which the detected message is being transmitted or received.

At block 412, the processor, when indicated by input to the workplace assistant client application, accesses multiple channels coupled to the workplace assistant client application to determine additional information related to the remote user or the remote user's communication in the various channels. These channels can be accessed through network 320 generally as described above with respect to FIG. 3. Channels based on audioconferencing, videoconferencing, or digital phone communication can collectively be referred to as teleconferencing channels.

At block 414, the processor submits the received message and the additional information to one or more predictive models to provide a context for the message. These predictive models can be accessed generally as described above with respect to FIG. 3. The processor can also submit metadata pertaining to the relevant individuals to the predictive model. For example, cloud-based intent detection and urgency model(s) 370 and/or cloud-based large language model 380 may be used. An urgency model that has been trained on the metadata may also be used. Alternatively, the corresponding models in the client devices may be used. The context is based not only on the received message but also on the additional information from the various channels to which the workplace assistant client application is coupled. Information can include communication, mentions, documents, social media data, as just a few examples.

Continuing with FIG. 4, at block 416, the processor generates, using predictive model output, a response message based at least in part on the context of the received message. The message can include emoji reactions, short replies based on templates for a quick response ("Will do," "Get back to you later," "Sounds good," etc.), or longer more salient replies.

At block 418, the processor displays or transmits the response message using the workplace assistant client application.

Referring now to the method 500 illustrated in FIG. 5, FIG. 5 shows an example method 500 for providing multichannel context-based action item generation. The description of the method 500 in FIG. 5 will be made with reference to the system of FIG. 3. However, any suitable system according to this disclosure may be used, such as the example systems 100 and 200 shown in FIGS. 1 and 2.

At block 510, a processor or processors, for example, a processor such as processor 810 (discussed below with respect to FIG. 8) running in the servers and/or in the client devices executing the client applications, detects, at the workplace assistant client application, electronic content associated with a remote user. For example, the workplace assistant client application 368a or 368b may be accessing various messaging channels, documents, scheduling platforms, teleconferencing platforms, and the like, in which a message, meeting notice, document, etc. is being transmitted or received. In this example, the action item generation is programmatically initiated by the system upon detection of relevant electronic content.

At block 512, the processor accesses multiple channels coupled to the workplace assistant client application to obtain additional information. These channels can be accessed through network 320 generally as described above with respect to FIG. 3.

At block 514, the processor submits the electronic content and the additional information to one or more predictive models to provide a context for the electronic content. These predictive models can be accessed generally as described above with respect to FIG. 3. Metadata pertaining to the relevant individuals can also be submitted. As examples, cloud-based intent detection and urgency model(s) 370 and/or cloud-based large language model 380 may be used. Alternatively, the corresponding models in the client devices may be used. The additional information from the various channels can include message content and information associated with the relevant users. The context is based on both the electronic content and the information from the various channels accessible to the workplace assistant client application, optionally including messaging from and mentions of the remote user. The context may also be based on the metadata.

Continuing with FIG. 5, at block 516, the processor generates, using predictive model output, an action item based at least in part on the context and the electronic content. The predictive model(s) can assess urgency and rank urgency and/or importance of a generated action to be scheduled. The model(s) can also personalize the action item by aggregating relevance to the user, taking into account relevant contacts based on stored collaboration data and past contexts, providing a rich data set for generating action items.

At block 518, the processor displays or stores the action item using the workplace assistant client application. Optionally, the workplace assistant client application can display a message generated by the predictive model and confirm the action item through the user interface for the workplace assistant client application. The predictive model can also provide recommendations through the user interface of tools or applications that would assist a user in dealing with the generated task item.

Figure 6:
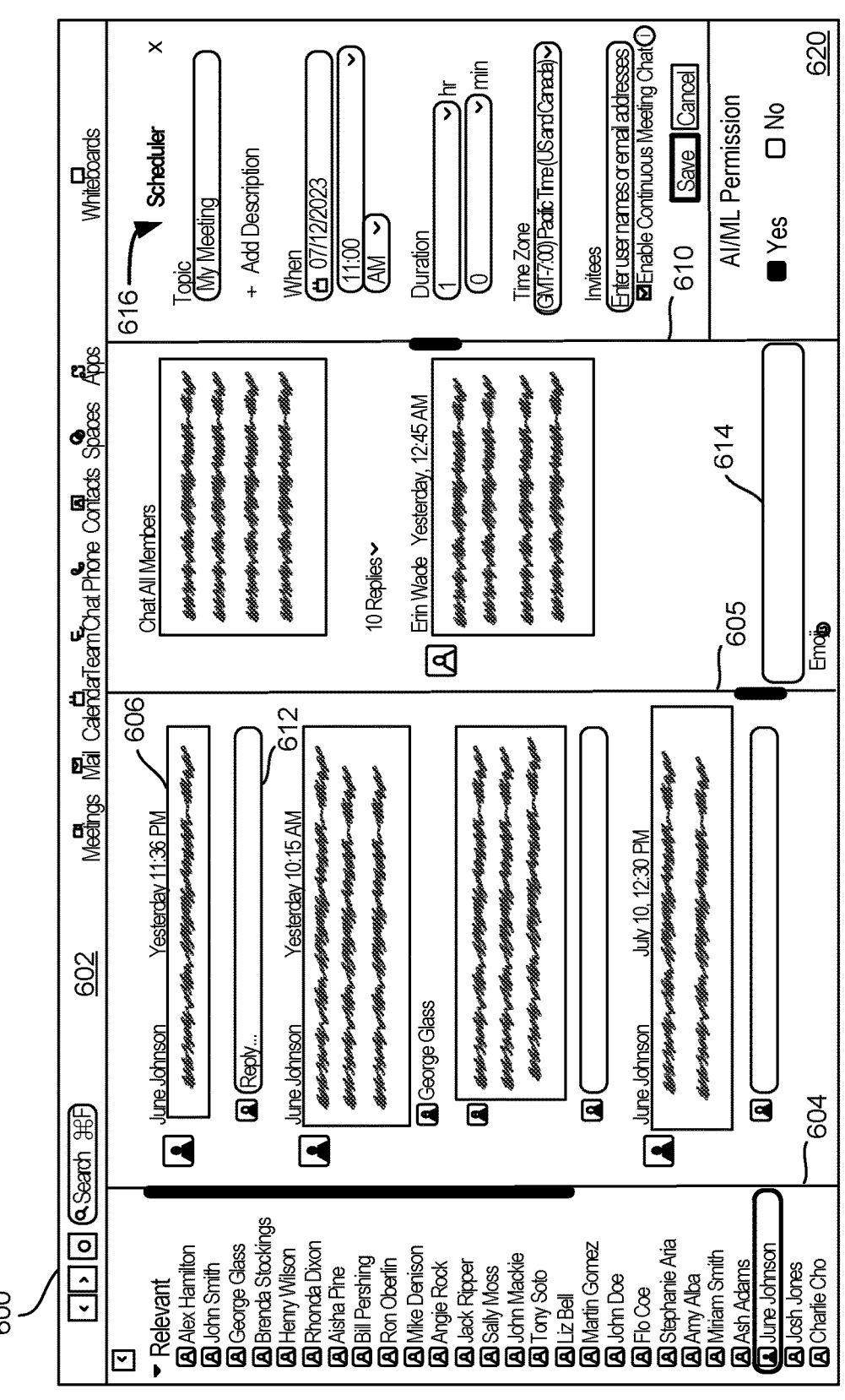
FIG. 6 illustrate an example screenshot of a user interface that provides message management and action item generation based on multichannel context.

Referring now to FIG. 6, FIG. 6 illustrates an example graphical user interface (GUI) 600 that is providing multichannel context-based actions and multichannel context-based message management. User interface 600 includes an icon strip 602 for access to various functions, such as meeting, email ("Mail"), calendar, team chat, contacts, phone, virtual spaces ("Spaces") and a digital whiteboard platform ("Whiteboards"). These functions may correspond to channels for determining context, but channels may include many other data sources or communication paths. GUI 600 also includes a "who is looking for you" (who-is-looking) list 604. This list of users can be sorted various ways with the dropdown box at the top. Currently these users are sorted by relevance. When input to the GUI is used to highlight another user, the snippets of the other user's messages or other content can be displayed in snippet panel 605 immediately adjacent to who-is-looking list 604. For example, message snippet 606 corresponds to the highlighted user in who-is-looking list 604. If a snippet such as message snippet 606 is highlighted, the context of that snippet is displayed in context panel 610.

In addition to ordering individuals by relevance in the who-is-looking list 604, users can be ordered by other criteria. As examples, time and date of last activity, name, or organization. Relevance can be indicated by numbers of interactions with the individual, number of shared activities, or number of shared organizations to name a few examples. An individual in the list may have higher relevance because there has been more direct messaging between the individual and the user of the application instance associated with GUI 600 as compared to other users, or because there has been more interaction in meetings, whiteboards, etc. Relevance may also take into account context from various channels. In some examples, a user can maximize relevance of specific individuals by designating the individual as important in the user interface or in a stored profile for the individual.

Channels, for purposes of this disclosure, can include email, chat, videoconferencing, digital phone, virtual spaces (?), and electronic whiteboards. Channels for context purposes may also include mentions in accessible documents, social media, externally linked platforms for project management, collaboration, or software development. A channel can be any accessible source of information or communication associated with individuals using, or visible to, the workplace assistant platform. Note that needed information from at least some channels, for example, email and team chat, can be presented in GUI 600 without necessarily needing to interact with the dedicated applications for those platforms.

Context panel 610 in GUI 600 in FIG. 6 can display, for messages such as email, chat, and transcriptions of teleconferences, replies as well as text or electronic content associated with relevant individuals before and after the occurrence of a snippet highlighted in snippet panel 605. This display enables a user to read this material without opening the application in which the material originated.

Continuing with FIG. 6, when a user highlights a message in snippet panel 605, such as snippet 606, the system can detect the received message and access channels coupled to the workplace assistant client application. The message corresponding to snippet 606 is submitted to the predictive models to provide context for the message. The context is based on information from multiple channels, including a lack of information present in the channels. If there is no relevant data in any of the other channels, the workplace assistant client application can be configured so that the models will then use only the received message or only the received message and available metadata. The received message itself is information from one of the channels. The processor running the workplace assistant application will generate a response message based at least in part on the context, and display the response message in text box 612. The user can send the message, edit the message, or cancel the process. In some embodiments, the workplace assistant client application can be configured to send the message without waiting for user input. A response can also be generated for text box 614 in response to a different message from the context of snippet 606 as displayed in context panel 610. The user can highlight that message and click on text box 614 to initiate the process. Note that elements other than text can be included in generated response messages, for example, emoji.

Action item 616 is being generated by the workplace assistant client application in response to detecting electronic content associated with one or more remote users of the platform, where such individuals are relevant to the local user, for example, coworkers, supervisors, clients, etc. The system can be configured to generate the action item automatically, and may or may not present the action item to the user for validation. In the example of FIG. 6, the action item 616 is a meeting with a topic, a time, a duration, and invitees. The system running the workplace assistant client application accesses multiple channels coupled to the workplace assistant client application and submits the electronic content to the predictive model(s) to provide a context for the electronic content based on information from the channels and potentially additional information such as stored metadata. The workplace assistant client application then generates, using the predictive models, the action item 616 based at least in part on the context of the electronic content. The action item can be displayed for ratification by the user or can simply be stored, which may trigger invitations by the videoconferencing meeting platform.

Permission panel 620 in FIG. 6 allows a user to indicate whether local data can be used for AI or machine learning (MI) training purposes. If "Yes" is selected, local data may be used. If "No" is selected, only generic data may be used. Generic data may be obtained from one or more commercially licensed or otherwise publicly available data sets that do not contain the personal information of the user or organization.

Referring now to the method 700 illustrated in FIG. 7, FIG. 7 shows an example method 700 for providing multi-channel context-based message management and context-based action items. The description of the method 700 in FIG. 7 will be made with reference to the graphic user interface shown in FIG. 6, and also with respect to the system of FIG. 3. However, a graphical user interface of any suitable design may be used. Also, any suitable system according to this disclosure may be used, such as the example systems 100 and 200 shown in FIGS. 1 and 2.

At block 710, a processor trains predictive models with generic data. For example, the processor and the models may initially be part of a cloud-based system to distribute the workplace assistant client application to various client devices. The models may include cloud-based intention detection and urgency model(s) 370 and cloud-based large language model (LLM) 380. The models are configured for training in part using generic data and in part using secured user data. At block 712, a processor deploys pre-trained predictive models to client devices, possibly as part of an update to an instance of the workplace assistant client application. At block 714, the processor updates training of the predictive models using secured user data from the client device. For example, this data may be recorded in a secure enclave in the processor or in memory of the client device. The fully trained models may include client intent detection/urgency models 372 and 374, as well as client large language models 382 and 384.

Continuing with FIG. 7, at block 716, the processor detects triggering content or input. Message generation by the workplace assistant client application in this example may be triggered through the user interface by input indicating a desire to respond to a received message, for example in text box 612 or text box 614 of GUI 600. Action item generation may be triggered automatically and optionally confirmed by input to the user interface. At block 718 the processor accesses stored metadata, the channels to which the workplace assistant client application is connected, and or messages from other relevant users of the system. Stored metadata can include, as examples, relationship, relevance, group membership, active channels, mentions, or previous interactions. At block 720, the processor submits metadata, information retrieved from various channels and/or received message(s) to the client intent detection model, urgency model, and the LLM. The LLM can be used to summarize unread messages for the intent detection model. At block 722 metadata, relevant messages, and other information, along with the intent as determined by the intent detection model are submitted by the processor to the LLM.

Staying with FIG. 7, at block 724, the processor uses the large language model and/or the urgency model to generate a response message and/or action item. In the case of a response, the urgency model also stack ranks potential messages based on urgency. As an example, a proposed response can be generated in text box 612 or text box 614 of GUI 600. The message may vary based on urgency in addition to being composed based on context and the received message(s). As an example, an action item such as the action item 616, a meeting, in GUI 600, can also or alternatively be generated. In the case of the action item, in this example, the predictive models can be used assess urgency and rank or prioritize action items based on importance of a generated action to be scheduled. The models can also personalize the action item by aggregating relevance to the user, considering relevant contacts based on stored collaboration data and past contexts. At block 726, a prompt and confirmation interaction is provided through the user interface of the relevant workplace assistant client application. This prompt and confirmation results in a system where a user confirms what the predictive models have proposed prior to committing to the response message or action item. At block 728, the message is transmitted, or the action item is stored in the relevant application, to which the workplace assistant client application may have access to in order to present action items in its user interface 600.

At block 750 of FIG. 7, a determination is made as to whether training of the predictive models needs to be updated. This decision may be made programmatically based on, as examples, the passage of time, the number of tasks and messages generated, or by input requesting retraining due to poor quality recommendations. If retraining is to take place, processing passes back to block 714. Otherwise, processing passes back to block 716 to await the next event. In the example of FIG. 7, secured user data is used to retrain the models. In other examples, generic data or a combination of secured user data and generic data may be used for retraining.

Figure 8:
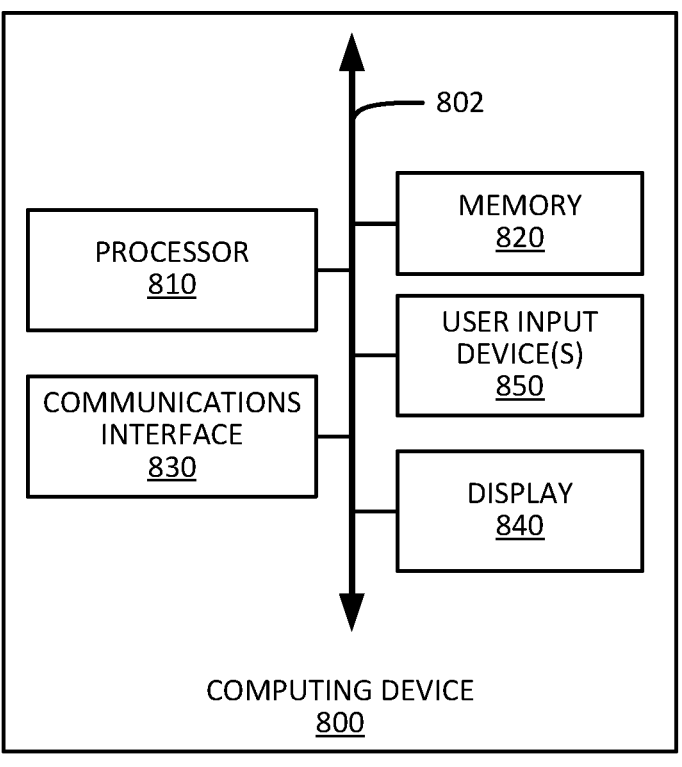
FIG. 8 shows an example computing device suitable for use with any disclosed systems, user interfaces, or methods according to this disclosure.

Referring now to FIG. 8, FIG. 8 shows an example computing device 800 suitable for use in example systems or methods for providing message management and action item generation. The example computing device 800 includes a processor 810 which is in communication with the memory 820 and other components of the computing device 800 using one or more communications buses 802. The processor 810 is configured to execute processor-executable instructions stored in the memory 820 to perform one or more methods for providing multichannel context-based message management and context-based action items. The computing device, in this example, also includes one or more user input devices 850, such as a keyboard, mouse, touchscreen, video input device (e.g., one or more cameras), microphone, etc., to accept user input, for example user input directed to accepting or rejecting a generated message or a generated action. The computing device 800 also includes a display 840 to provide visual output to a user, as in some examples, the screen display of FIG. 6.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

As used below, any reference to a series of examples is to be understood as a reference to each of those examples disjunctively (e.g., "Examples 1-4" is to be understood as "Examples 1, 2, 3, or 4").

Example number 1 is a method including detecting, at a workplace assistant client application, electronic content associated with a remote user and accessing channels communicatively coupled to the workplace assistant client application. The method also includes submitting the electronic content and information from the channels to a predictive model to provide a context for the electronic content and generating, using output of the predictive model, an action item based at least in part on the electronic content and the context of the electronic content. The method further includes displaying or storing the action item using the workplace assistant client application.

Example number 2 is a method according to example 1, where the predictive model further comprises a large language model, an intent detection model, and an urgency model.

Example number 3 is a method according to examples 1-2, where submitting the electronic content and the information from the plurality of channels to a predictive model further comprises submitting the electronic content and the information over a network.

Example number 4 is a method according to examples 1-3, where submitting the electronic content and the information from the plurality of channels to a predictive model further comprises submitting the electronic content and the information to at least one of the large language model, the intent detection model, or the urgency model on a client device.

Example number 5 is a method according to examples 1-4, where the action item comprises at least one of a to do item, a meeting agenda, a reminder, a meeting, or a task.

Example number 6 is a method according to examples 1-5, where the workplace assistant client application is configured to detect the electronic content in any of the plurality of channels, and wherein the plurality of channels includes email, chat, and at least one teleconferencing channel.

Example number 7 is a method according to examples 1-6, further comprising prioritizing the action item among a plurality of action items in the workplace assistant client application.

Example number 8 is system including a processor and at least one memory device including instructions that are executable by the processor to cause the processor to execute the method of any of examples 1-7.

Example number 9 is a non-transitory computer-readable medium including code that is executable by a processor for causing the processor to carry out the method of any of examples 1-7.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, memory device, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

detecting, at a workplace assistant client application on a client device configured for use with an integrated communication system, electronic content associated with relevant users of the integrated communication system;

accessing a plurality of channels communicatively coupled to the workplace assistant client application and metadata describing the relevant users, the metadata configured to describe relationships, group memberships, and previous interactions;

submitting the electronic content, the metadata, and information from the plurality of channels to a predictive model to provide a multichannel context for the electronic content, the multichannel context based on the information, the metadata, collaboration data and past contexts for the relevant users;

generating, from the relevant users, a who-is-looking list of remote users looking for a user of the client device, wherein the who-is-looking list is sorted by relevance based on the multichannel context provided by the predictive model;

generating, using output of the predictive model, an action item based at least in part on the electronic content and the multichannel context of the electronic content;

displaying the action item and the who-is-looking list using the workplace assistant client application; and displaying, responsive to input received from the user, a snippet of messages from at least one of the relevant users in the who-is-looking list as well as the electronic content associated with the snippet.

2. The method of claim 1, wherein the predictive model further comprises a large language model, an intent detection model, and an urgency model.

3. The method of claim 2, wherein submitting the electronic content, the metadata, and the information from the plurality of channels to the predictive model further comprises submitting the electronic content and the information over a network.

4. The method of claim 2, wherein submitting the electronic content, the metadata, and the information from the plurality of channels to the predictive model further comprises submitting the electronic content, the metadata, and the information to at least one of the large language model, the intent detection model, or the urgency model on the client device.

5. The method of claim 1, wherein the action item comprises at least one of a to do item, a meeting agenda, a reminder, a meeting, or a task.

6. The method of claim 1, wherein the workplace assistant client application is configured to detect the electronic content in any of the plurality of channels, and wherein the plurality of channels includes email, chat, and at least one teleconferencing channel.

7. The method of claim 1, further comprising prioritizing the action item among a plurality of action items in the workplace assistant client application.

8. A system comprising:

a processor; and at least one memory device including instructions that are executable by the processor to cause the processor to:

detect, at a workplace assistant client application on a client device configured for use with an integrated communication system, electronic content associated with relevant users of the integrated communication system;

access a plurality of channels communicatively coupled to the workplace assistant client application and metadata describing the relevant users, the metadata configured to describe relationships, group memberships, and previous interactions;

submit the electronic content, the metadata, and information from the plurality of channels to a predictive model to provide a multichannel context for the electronic content, the multichannel context based on the information, the metadata, collaboration data and past contexts for the relevant users;

generate, from the relevant users, a who-is-looking list of remote users looking for a user of the client device, wherein the who-is-looking list is sorted by relevance based on the multichannel context provided by the predictive model;

generate, using output of the predictive model, an action item based at least in part on the electronic content and the multichannel context of the electronic content;

display the action item and the who-is-looking list using the workplace assistant client application; and display, responsive to input received from the user, a snippet of messages from at least one of the relevant users in the who-is-looking list as well as the electronic content associated with the snippet.

9. The system of claim 8, wherein the predictive model further comprises a large language model, an intent detection model, and an urgency model.

10. The system of claim 9, wherein the workplace assistant client application is configured to access at least one of the large language model, the intent detection model, or the urgency model over a network.

11. The system of claim 9, wherein the workplace assistant client application comprises at least one of the large language model, the intent detection model, or the urgency model, and wherein the at least one of the large language model, the intent detection model, or the urgency model is configured for training in part using generic data and in part using secured user data stored in association with the workplace assistant client application.

12. The system of claim 8, wherein the action item comprises at least one of a to do item, a meeting agenda, a reminder, a meeting, or a task.

13. The system of claim 8, wherein the workplace assistant client application is configured to detect the electronic content in any of the plurality of channels, and wherein the plurality of channels includes email, chat, and at least one teleconferencing channel.

14. The system of claim 8, wherein the instructions cause the processor to prioritize the action item among a plurality of action items in the workplace assistant client application.

15. A non-transitory computer-readable medium comprising code that is executable by a processor for causing the processor to:

detect, at a workplace assistant client application on a client device configured for use with an integrated communication system, electronic content associated with relevant users of the integrated communication system;

access a plurality of channels communicatively coupled to the workplace assistant client application and metadata describing the relevant users, the metadata configured to describe relationships, group memberships, and previous interactions;

submit the electronic content, the metadata, and information from the plurality of channels to a predictive model to provide a multichannel context for the electronic content, the multichannel context based on the information, the metadata, collaboration data and past contexts for the relevant users;

generate, from the relevant users, a who-is-looking list of remote users looking for a user of the client device, wherein the who-is-looking list is sorted by relevance based on the multichannel context provided by the predictive model;

generate, using output of the predictive model, an action item based at least in part on the electronic content and the multichannel context of the electronic content;

display the action item and the who-is-looking list using the workplace assistant client application; and display, responsive to input received from the user, a snippet of messages from at least one of the relevant users in the who-is-looking list as well as the electronic content associated with the snippet.

16. The non-transitory computer-readable medium of claim 15, wherein the predictive model further comprises a large language model, an intent detection model, and an urgency model.

17. The non-transitory computer-readable medium of claim 16, wherein the workplace assistant client application is configured to access at least one of the large language model, the intent detection model, or the urgency model over a network.

18. The non-transitory computer-readable medium of claim 16, wherein the workplace assistant client application comprises at least one of the large language model, the intent detection model, or the urgency model, and wherein the at least one of the large language model, the intent detection model, or the urgency model is configured for training in part using generic data and in part using secured user data stored in association with the workplace assistant client application.

19. The non-transitory computer-readable medium of claim 15, wherein the action item comprises at least one of a to do item, a meeting agenda, a reminder, a meeting, or a task.

20. The non-transitory computer-readable medium of claim 15, wherein the code causes the processor to prioritize the action item among a plurality of action items in the workplace assistant client application.

* * * * *